US012629749B2

(12) United States Patent
Elton et al.

(10) Patent No.: US 12,629,749 B2
(45) Date of Patent: May 19, 2026

(54) SYSTEMS AND METHODS FOR PARTIAL SINTERING OF POWDER TO CREATE LARGER POWDER PARTICLES FOR ADDITIVE MANUFACTURING PROCESSES

(71) Applicant: Lawrence Livermore National Security, LLC, Livermore, CA (US)

(72) Inventors: Eric S. Elton, Livermore, CA (US); Kevin Huang, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 17/991,642

(22) Filed: Nov. 21, 2022

(65) Prior Publication Data

US 2024/0165703 A1     May 23, 2024

(51) Int. Cl.
B22F 1/052          (2022.01)
B22F 1/142          (2022.01)
(Continued)

(52) U.S. Cl.
CPC .............. B22F 1/052 (2022.01); B22F 1/142 (2022.01); B22F 12/90 (2021.01); B33Y 70/00 (2014.12);
(Continued)

(58) Field of Classification Search
CPC ........................... B22F 9/04; B22F 2009/041; B22F 2009/049; B22F 2009/0844;
(Continued)

(56) References Cited

U.S. PATENT DOCUMENTS 4,585,619 A  *  4/1986  Westin ...................... B22F 3/15
                                                             419/33
4,635,572 A  *  1/1987  Nickel ...................... C10L 9/02
                                                             110/232
(Continued)

FOREIGN PATENT DOCUMENTS

CN          100408510 C   *   8/2008
CN          108380871 A   *   8/2018   .............. B22F 3/008
(Continued)

OTHER PUBLICATIONS

Bhosle, V., et al. "Dehydrogenation of TiH2." Materials Science and Engineering: A 356.1-2 (2003): 190-199. (Year: 2003).*
(Continued)

*Primary Examiner* — Keith D. Hendricks
*Assistant Examiner* — Moriah S. Smoot
(74) *Attorney, Agent, or Firm* — HARNESS, DICKEY & PIERCE, P.L.C.

(57) ABSTRACT

A system for creating a second quantity of sinterable powder particles which have sizes falling within a second size range, from a first quantity of sinterable powder particles having sizes falling within a first size range, and where the sizes of the powder particles in the second size range are all larger than those in the first size range. In one embodiment the system has a heating component responsive to a predetermined temperature/time heating profile, which heats the first quantity of powder particles using the temperature/time heating profile, to cause partial sintering of the powder particles, which creates a new plurality of powder particles which have an increased dimension. A movement component is incorporated to at least one of separate the new powder particles from remaining ones of the powder particles of the first quantity of powder particles, or to further process the new plurality of powder particles, such that the
(Continued)

new plurality of powder particles represents the second quantity of sinterable powder particles.

11 Claims, 3 Drawing Sheets

(51) Int. Cl.
   *B22F 9/04*          (2006.01)
   *B22F 9/08*          (2006.01)
   *B22F 12/90*         (2021.01)
   *B33Y 70/00*         (2020.01)

(52) U.S. Cl.
   CPC ... *B22F 2009/041* (2013.01); *B22F 2009/049* (2013.01); *B22F 2009/0844* (2013.01); *B22F 2009/0896* (2013.01); *B22F 2998/10* (2013.01); *B22F 2999/00* (2013.01)

(58) Field of Classification Search
   CPC .......... B22F 2009/0896; B22F 2998/10; B22F 2999/00; B33Y 70/00
   See application file for complete search history.

(56)                References Cited

U.S. PATENT DOCUMENTS

| | | | |
|---|---|---|---|
| 6,338,816 B1 * | 1/2002 | Fife .................... | C22C 32/0068 |
| | | | 419/36 |
| 2011/0214534 A1 | 9/2011 | Smokovich et al. | |
| 2015/0329430 A1 * | 11/2015 | Sun .................. | C04B 35/62222 |
| | | | 427/576 |
| 2016/0215390 A1 * | 7/2016 | She ......................... | C23C 16/01 |
| 2016/0290223 A1 * | 10/2016 | Mills ....................... | F02B 51/02 |
| 2019/0001414 A1 | 1/2019 | Konyashin et al. | |
| 2020/0238375 A1 * | 7/2020 | Poirier ................... | B22F 10/34 |
| 2021/0146622 A1 * | 5/2021 | Myerberg ............. | B29C 64/357 |

FOREIGN PATENT DOCUMENTS

| | | | |
|---|---|---|---|
| JP | 2003231903 A | | 8/2003 |
| JP | 2021031685 A | * | 3/2021 |
| KR | 20210085244 A | | 7/2021 |
| KR | 20220145421 A | | 10/2022 |

OTHER PUBLICATIONS

Robertson, I. M., and G. B. Schaffer. "Some effects of particle size on the sintering of titanium and a master sintering curve model." Metallurgical and materials transactions A 40 (2009): 1968-1979. (Year: 2009).*

MTI Corporation. High Temperature Vacuum Tube Furnace OTF-1200X-S50-LVT Operation Manual, www.mse.ucr.edu/sites/default/files/2019-02/OTF-1200X-S50-LVT.pdf. Published Feb. 2019. Accessed Feb. 23, 2024. (Year: 2019).*

Abe, Hiroya, et al. "Control of nanostructure of materials." Nanoparticle Technology Handbook. Elsevier, 2008. 177-265. (Year: 2008).*

Qu, Na, and Wen You. "Design and fault diagnosis of DCS sintering furnace's temperature control system for edge computing." PloS one 16.7 (2021): e0253246. (Year: 2021).*

I. M. Robertson & G. B. Schaffer. "Review of densification of titanium based powder systems in press and sinter processing", Powder Metallurgy, vol. 53, Issue 2, 2010, pp. 141-153.

K. S. Narasimhan. "Sintering of powder mixtures and the growth of ferrous powder metallurgy", Materials Chemistry and Physics, vol. 67, Issues 1-3, Jan. 15, 2001, pp. 56-65.

Nina L. Menon. "Effects of Powder Recycling in Selective Laser Melting." (2020), 35 pages.

ISA/KR International Search Report and Written Opinion in corresponding International Application No. PCT/US2023/080050 mailed Mar. 12, 2024.

* cited by examiner

SYSTEMS AND METHODS FOR PARTIAL SINTERING OF POWDER TO CREATE LARGER POWDER PARTICLES FOR ADDITIVE MANUFACTURING PROCESSES

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to systems and methods for processing granular material, such as powders, that are often used in additive manufacturing applications as feedstock material, and more particularly to systems and methods for reprocessing granular particles which are too small for use in an additive manufacturing application into larger size particles suitable for use in additive manufacturing applications.

BACKGROUND

The statements in this section merely provide background information related to the present disclosure and may not constitute prior art.

Powder processing is used for creating powder particles that are of suitable sizes to be used in additive manufacturing applications as a feedstock material. The powder particles are of materials that are able to be melted or sintered, typically using a laser, to produce parts using an additive manufacturing system. Sintering is the process where powder particles are heated to a high temperature below their melting point, and solid diffusion occurs. During the sintering process, particles located next to each other will fuse, or sinter, together where they are in contact. Typically sintering is used to make near full density solid parts by allowing strong bonds and networks to form between neighboring particles. This process typically takes many hours or days to occur, depending on the material properties and temperature used in the manufacturing process.

During typical powder making processes, a wide distribution of powder particle sizes is often produced. Although efforts are made to optimize the powder particles for a desired, final size distribution, there are always some powder particles produced that are too small and fall below the desired final powder size or size range. Depending on the powder material (i.e. metal vs. ceramic powders), the undersized powder particles are either remelted or pressed into a solid part, and then recycled back into the powder making process. This process requires extra steps, that is, pressing or remelting in addition to the powder making process, and can require significant extra time and energy, resulting in increased costs overall.

Accordingly, a need exists for particle manufacturing systems and methods which can increase the size of meltable or sinterable powder particles which are below a minimum acceptable size range, and without the added time and expense of re-melting the smaller-than-acceptable powder particles. Such systems and method can be expected to save time, energy and costs in the reprocessing of smaller-than-acceptable powder particles.

SUMMARY

This section provides a general summary of the disclosure, and is not a comprehensive disclosure of its full scope or all of its features.

In one aspect the present disclosure relates to a method for creating a second quantity of sinterable powder particles which have sizes falling within a second size distribution range, from a first quantity of sinterable powder particles having sizes falling within a first size distribution range, and where the sizes of the powder particles in the second size distribution range are all larger than the sizes of the particles in the first size distribution range. The method may comprise heating the first quantity of sinterable powder particles using a predetermined temperature/time heating profile sufficient to cause partial sintering of ones of the powder particles within the first quantity of sinterable powder particles, to create a new plurality of powder particles which have an increased dimension. The method may also include processing the new powder particles such that the new plurality of powder particles represents the second quantity of sinterable powder particles.

In another aspect the present disclosure relates to a system for creating a second quantity of sinterable powder particles which have sizes falling within a second size distribution range, from a first quantity of sinterable powder particles having sizes falling within a first size distribution range, and where the sizes of the powder particles in the second size distribution range are all larger than the sizes of the particles in the first size distribution range. The system may comprise a heating component configured to apply a predetermined, temperature/time heating profile to the first quantity of sinterable powder particles to controllably heat the first quantity of sinterable powder particles using the temperature/time heating profile, to cause partial sintering of ones of the powder particles within the first quantity of sinterable powder particles to create a new plurality of powder particles which have an increased dimension. The system may also include a sieve controlled to separate the new powder particles from remaining ones of the powder particles of the first quantity of sinterable powder particles, such that the new plurality of powder particles represents the second quantity of sinterable powder particles.

In still another aspect the present disclosure relates to a system for creating a second quantity of sinterable powder particles which have sizes falling within a second size distribution range, from a first quantity of sinterable powder particles having sizes falling within a first size distribution range, and where the sizes of the powder particles in the second size distribution range are all larger than the sizes of the particles in the first size distribution range. The system may comprise a heating component configured to apply a predetermined, temperature/time heating profile to the first quantity of sinterable powder particles to controllably heat the first quantity of sinterable powder particles using the temperature/time heating profile, to cause partial sintering of ones of the powder particles within the first quantity of sinterable powder particles to create a new plurality of powder particles which each have an increased dimension larger than the second size distribution range. The system may also include a mill controlled to further process the new plurality of powder particles to break down the new plurality of powder particles such that each one of the new of plurality of powder particles is reduced in dimensions to fall within the second distribution range.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to systems and methods for partially sintering smaller-than-acceptable sized powder particles to increase the size of the powder particles without producing fully dense, or near fully dense, powder particles. Instead, the smaller-than-acceptable sized powder particles are collected into a quantity and the quantity is heated to a predetermined high temperature. The quantity of powder particles are then held at the predetermined temperature for a shorter amount of time than required to produce a fully sintered part. During this time, neighboring powder particles sinter together. However, because the time is too short to allow for a full-strength network to develop, the quantity of powder remains a quantity of powder particles, but with the powder particles having an increased size when the partial sintering has been completed. Thus, the powder particle size is increased without the formation of a strong part.

Figure 1:
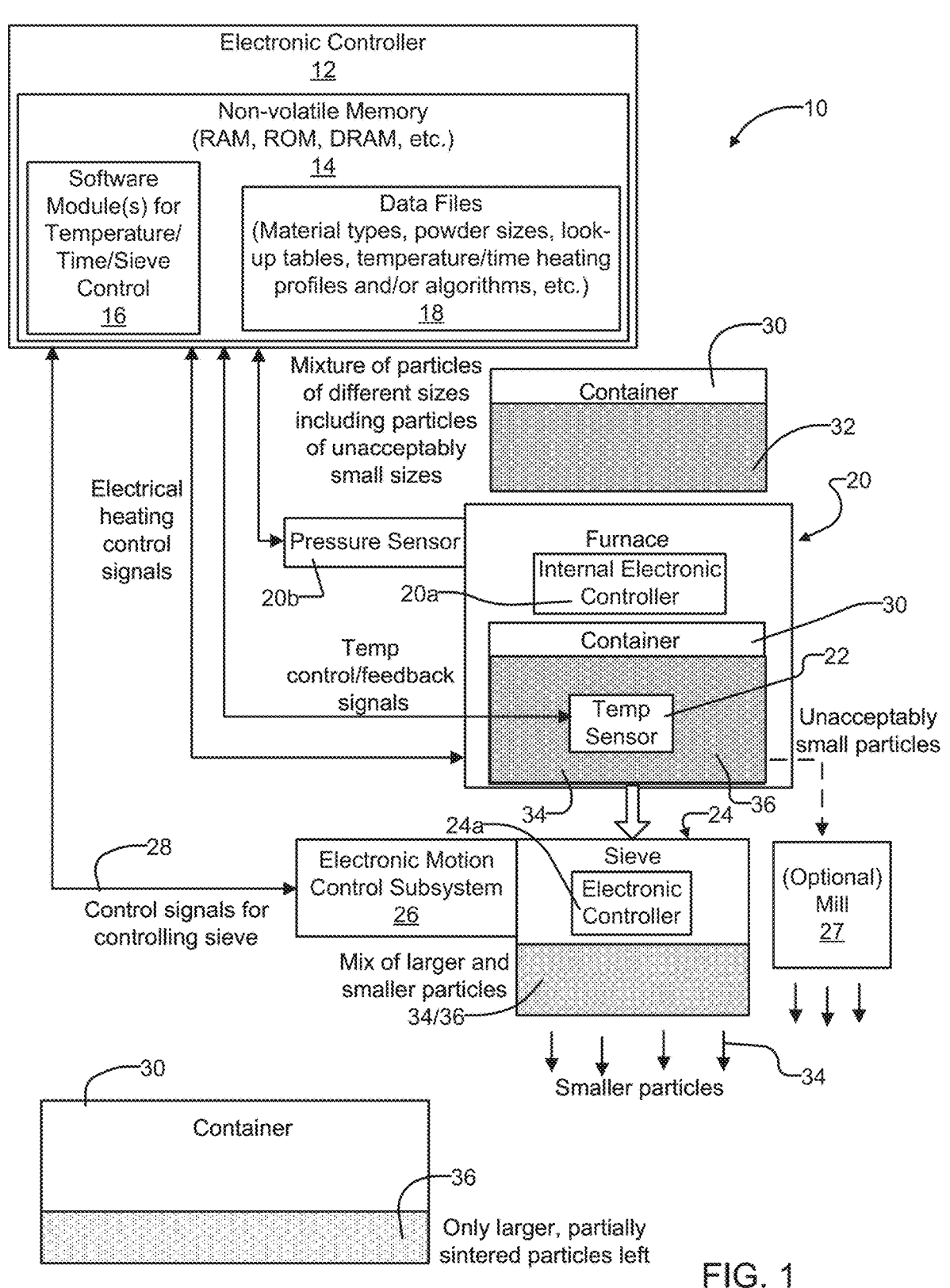
FIG. 1 is a high level schematic view of one example of a system in accordance with the present disclosure for creating larger particles from a quantity of smaller-than-acceptably dimensioned powder particles.

Referring to FIG. 1, a system 10 in accordance with one embodiment of the present disclosure is shown. The system 10 in this example may include an electronic controller 12 having a memory 14, which may be a non-volatile memory. The non-volatile memory 14 may include one or more software modules 16 for carrying out temperature/time control programs or algorithms, gas control (flow or vacuum) algorithms as well as for controlling sieve movement controls signals. One or more data files 18 may also be stored in the memory 14. The data files 18 may relate to temperature/time curves to be used for various powdered materials, characteristics of different powder materials, sintering temperatures needed for different types of materials, particle size distribution ranges which are desired for different types of powder particles, etc.

The system 10 may also include a furnace 20, or the furnace may be a separate component which the system 10 is used with. If the furnace 20 forms a portion of the system 10, the furnace may include an internal electronic controller 20a and/or a temperature sensor 22. The temperature sensor 22 may be in communication with the internal electronic controller 20a, and/or it may be in communication with the electronic controller 12. Similarly, the internal electronic controller 20a of the furnace 20 may be in communication with the electronic controller 12. In any one of these configurations, the temperature sensor 22 may provide real time temperature data to the electronic controller 20a and/or the electronic controller 12. In this regard, the furnace 20 may be primarily responsible for controlling and monitoring the heating of powder particles using its internal controller 20a, or the electronic controller 12 may be performing these operations. Still further, the two electronic controllers 20a and 12 may share one or more of the heating and temperature monitoring responsibilities. Preferably, the temperature sensor 22 is located within the powder particles being heated to optimize measurement accuracy of the temperature being experienced by the powder particles. The furnace 20 is preferably operated to perform heating in a vacuum environment, or optionally it may be operated so that the heating is performed in an environment using argon, helium, or another inert gas to help prevent oxidation of the powder particles.

The furnace 20 may also include a pressure sensor 20b which may be monitored by the internal electronic controller 20a or optionally by the electronic controller 12. The pressure sensor 20a provides a pressure output signal indicating an atmospheric condition within the furnace 20, which is helpful and desirable to monitor during heating, and particularly if a vacuum environment needs to be maintained within the furnace during its operation A sieve 24, which forms a movement component, may also be included as part of the system 10, or the sieve may be a component which is interfaced to the system. The sieve 24 may include its own internal electronic controller 24a as well as an electronically controlled motion subsystem 26. The motion subsystem 26 may cause vibration, agitation, and/or X/Y axis movement of the sieve to help facilitate the separation and removal of different sized powder particles held within the sieve. If the electronic motion control subsystem 26 is included, and the subsystem 26 includes a suitable communications interface, then a communications control line 28 may be coupled to an output port of the electronic controller 12 to enable the electronic controller 12 to control the electronic motion control subsystem 26 as needed to carry out the separation of different sized particles held within the sieve 24. Optionally, the electronic controller 12 may be configured to communicate with the internal electronic controller 24a of the sieve as well, to partially or fully help control operation of the sieve 24.

In some embodiments the system 10 may also include a mill 27. The mill 27 may be used for breaking down larger-than-desired powder particles, as will be explained further in the following paragraphs. The mill 27 is used to act on powder particles after the powder particles are partially sintered using the furnace 20, or alternatively after the powder particles are separated using the sieve 24. In some implementations two or more alternating milling and sieving operations may also be performed to provide a potentially finer granularity or even closer dimensional tolerance range for the finished powder particles or to increase yield.

With further reference to FIG. 1 and a flowchart 100 of FIG. 2, one sequence of operations in accordance with the present disclosure for creating larger powder particles with a desired particle size distribution from a quantity of smaller-than-acceptably sized powder particles will be described. Initially a container 30 may be used to hold a quantity of powder particles 32 which have dimensions of varying sizes, but which are too small for use in an additive manufacturing ("AM") process. In other words, the quantity of powder particles 32 is formed by powder particles which do not meet a minimum dimension requirement for use in an AM process. The quantity of powder particles 32 may be made up of metal powder particles, ceramic powder particles, a mixture thereof, or any other composition of powder particles which is sinterable in an AM process.

Figure 2:
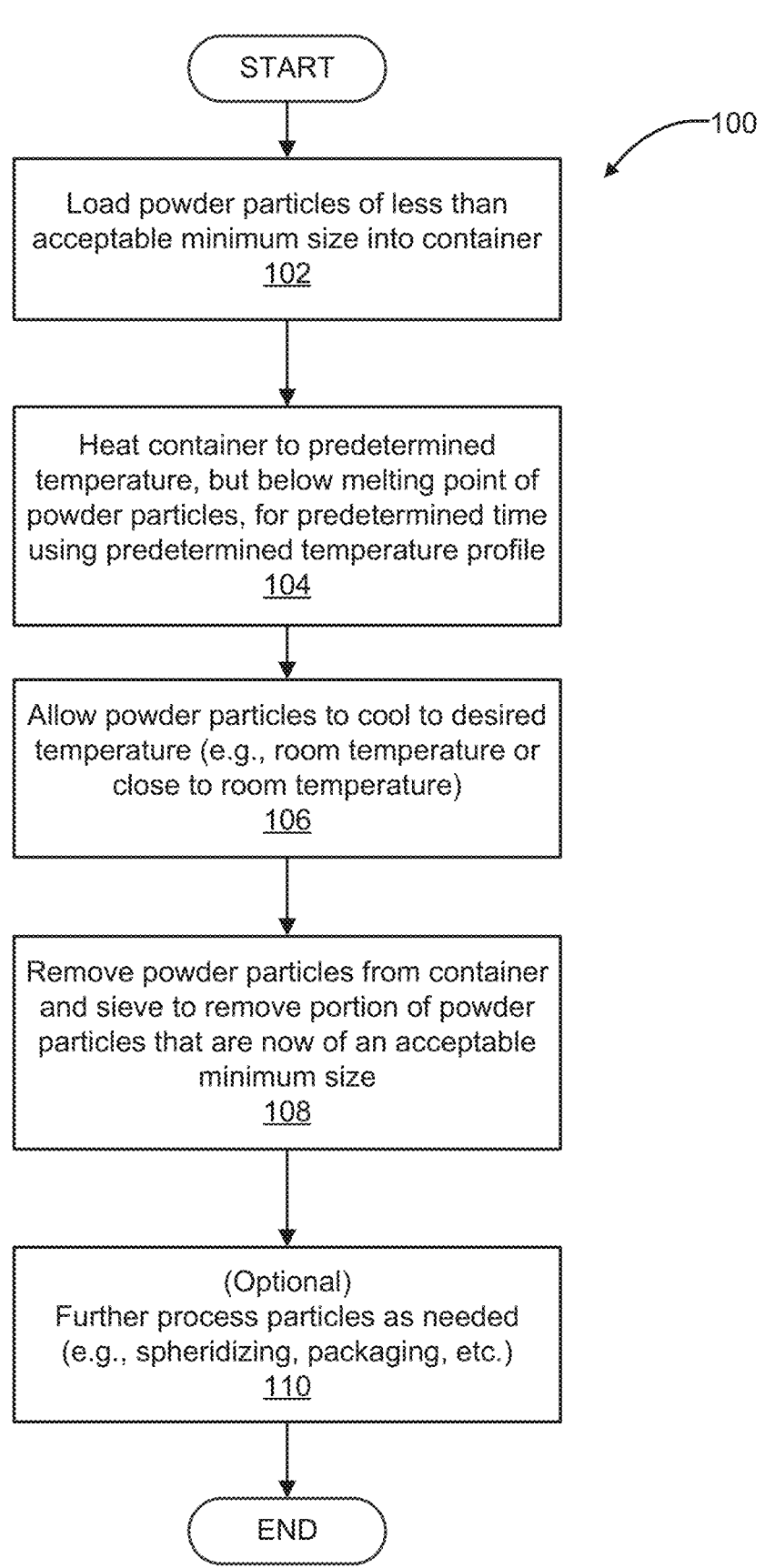
FIG. 2 is a high level flowchart setting forth one example of operations that may be performed by a method of the present disclosure in partially sintering a quantity of smaller-than-acceptably dimensioned powder particles to create larger dimensioned powder particles which have dimensions making them suitable for use in an AM process.

At operation 102 in FIG. 2, the powder particles 32 are loaded into the container 30. At operation 104 the container 30 may be heated, such as by placing the container 30 in the furnace 20, for a predetermined time period using a predetermined heating profile that raises the temperature of the powder particles 32 to a predetermined temperature which is below the melting point of the powder particles, but which is still sufficient to cause partial sintering of the powder particles. The powder particles 32 are heated for a predetermined time period. In one implementation the software modules 16 include an algorithm for implementing a ramp-up/hold/ramp-down heating profile. This heating profile may vary significantly depending on the specific composition of the powder particles, but in one example a heating profile including a temperature ramp-up to about 700° C. within about 30 minutes-1 hour, a hold at about 700 C for between about 4-24 hours, and a cooling period of at least about 2-3 hours, and in some instances longer (e.g., 12 hours) may be used. The average starting dimensions of the powder particles, as well as their composition, may both influence the selection of an optimum heating profile. Creating larger sized, partially sintered particles may be expected to require a longer hold time. Optionally, an active cooling system may be employed to enable a more controlled and/or extended temperature ramp-down (i.e., cooling period) to reduce and/or eliminate tensions on the bonds of newly partially sintered powder particles. Specific parameters will be material specific. The temperature and heating time may be controlled by the electronic controller 12 by using one or more items of the stored information in the data files 18, for example the specific composition of the powder particles that are being processed and/or the desired size distribution of the finished powder particles. In one embodiment the heating may be monitored in real time by the electronic controller 12, by which the electronic controller monitors the temperature of the powder particles 32 as the heating process is carried out, and makes temperature adjustments in real time, as needed, to maintain a desired temperature/time heating profile. Alternatively, the heating may be carried out by the electronic controller 12 using an open loop process where a fixed, temperature/time heating profile, suitable for the particular composition of powder particles being acted on, and a specific desired particle size distribution range, has been determined in advance, and is simply applied by the electronic controller 12 without the use of any real time temperature feedback control. One or more temperature/ time/particle composition look-up tables may be used for the open loop approach. Thus, each of the ramp-up, hold and ramp-down portions of the heating profile may be implemented in either a closed loop or open loop fashion.

While the heating described above is occurring, neighboring powder particles within the quantity of powder particles will partially sinter together. However, because the heating time is too short to allow for a full-strength network to develop, the powder particles remain as powder particles when the partial sintering has been completed. Thus, the particle size of many of the powder particles will increase but without forming a single, fully formed part from the full quantity of the powder particles.

At operation 106 in FIG. 2, the container 30 may then be removed from the furnace 20 and the container will be allowed to cool further. The cooling period may be sufficient to allow the quantity of powder particles 34/36 to reach room temperature, or nearly room temperature, over a predetermined temperature ramp-down cooling period.

It will be understood that the container 30 will now contain a quantity of powder particles with different particle size distributions than the quantity of powder particles 32. More specifically, a subquantity of the powder particles will still be unacceptably small particles, and this is indicated in FIG. 1 using reference number 34, while another subquantity of the powder particles will be newly formed, larger sized powder particles 36. The larger sized powder particles 36 are partially sintered powder particles made up of two or more ones of the unacceptably small powder particles 34 and will be within a dimensional range making them suitable for use in an AM process.

At operation 108 in FIG. 2, once the quantity of powder particles 34/36 has cooled sufficiently it may be sieved. This may be accomplished by placing the quantity of powder particles 34/36 in the sieve 24 and operating the sieve for a predetermined time period sufficient to cause the still smaller-than-acceptable powder particles 34 within the quantity of powder particles 34/36 to fall out of the sieve 24. The powder particles remaining in the sieve 24 will be only the partially sintered powder particles 36 which have dimensions within a desired size range making them acceptable for use in an AM process. The desired size range may vary significantly depending on a number of factors, for example material composition, powder flowability, or powder shape, just to name a few such factors. In some AM applications powder particles having a diameter of about 15 microns to about 70 microns is particularly preferred. In some AM applications powder particles having a diameter of between about 15 microns to about 45 microns is more preferred. The system 10 of the present disclosure is able to create particles within these dimensional ranges, as well as particles with dimensions outside these ranges, efficiently and economically.

Lastly, in FIG. 2, operation 110 is an optional operation where further processing of the quantity of powder particles 36 may be undertaken. This optional processing may involve one or more operations involving spheridizing the particles (i.e., making the particles more spherical, typically be melting and allowing the particles to solidify during freefall), further sorting the quantity of powder particles 36 into one or more different particle size distributions, etc.

Figure 3:
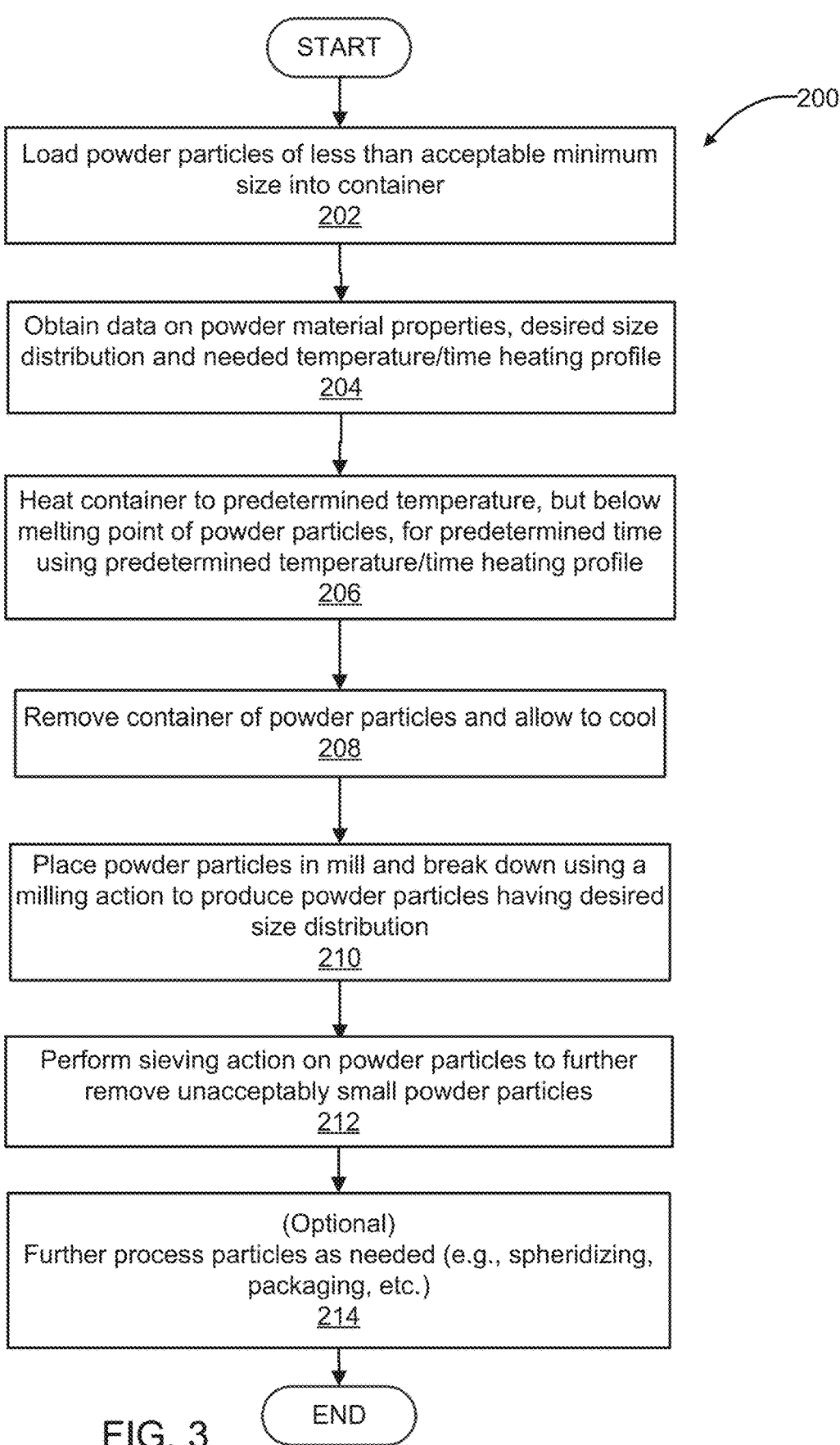
FIG. 3 is a flowchart setting forth another example of operations that may be performed by a method of the present disclosure, which involves partially sintering a quantity of smaller-than-acceptably dimensioned powder particles to produce partially sintered powder particles which are larger than desired, and then using a milling operation to reduce the size of the particles down to an acceptable dimension, and finally performing a sieving action to remove remaining ones of the powder particles that are smaller than acceptable in dimension.

FIG. 3 shows a flowchart 200 illustrating another process in accordance with the present disclosure for creating powder particles of a desired size distribution from a starting quantity of smaller-than-acceptable dimensioned powder particles. Operation 202 is similar to operation 102 wherein a quantity of powder particles, such as the quantity of smaller-than-acceptable dimensioned powder particles 32 shown in FIG. 1, is initially loaded into the container 30. At operation 204 the needed data on powder material property (ies), desired particle size distribution, needed temperature/ heating profile(s) etc. may be obtained by the electronic controller 12 from the data files 18. However, the temperature/heating profile(s) used will be such as to cause significant particle sintering to occur such that most, or all, of the powder particles comprise a new quantity of powder particles which are now unacceptably large for use in an AM application. The heating may be carried out using the furnace 20 or any other suitable implement.

At operation 208, once the heating operation has been carried out using the predetermined heating/temperature profile and the heating time has expired, the new quantity of powder particles are allowed to cool for a predetermined time period (e.g., to reach room temperature or nearly room temperature). The cooled powder particles will now be mostly, or all, of a size which is larger than desired, although a small quantity of smaller-than-acceptable dimensioned powder particles will typically still exist. At operation 210, the new, larger-than-acceptable quantity of powder particles may be placed in a mill, for example mill 24*a* shown in FIG. 1, and broken down using a milling action to such that a majority of all the powder particles fall within a desired particle size distribution and produce a finished quantity of powder particles. At operation 212 a sieving operation may then be performed to remove the small quantity of powder particles that remain, and which are still smaller-than-acceptable, which leaves only the particles with a desired particle distribution range. Alternatively, the milling action 210 may be performed after the sieving operation 212. Still further, the sieving action 210 could be performed before, and then again after, the milling operation 212. Optionally the mill-sieve-mill-sieve operations could be performed multiple times if needed. Further processing may optionally be performed at operation 214 to spheridize or package the finished quantity of powder particles.

In either of the process described above for the flowcharts of FIGS. 2 and 3, the resulting larger dimensioned powder particles of a porous nature, since they are composed of several smaller particles sintered together with significant voids between them. As such, different temperature/time profiles can be used to create powder particles having differing, unique porous properties. It is expected that this advancement may be utilized to produce parts having engineered porosities. For example, some possible applications may include catalyst development, biomedical implants (providing ample surface area to grab on to), supported, lightweight structures or ceramics. Some or all of these possible applications may require further processing beyond what is described in the present disclosure to get from particle to finished shape, but such applications are expected to be of interest, in view of the teachings presented herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for creating a second quantity of sinterable powder particles which have sizes falling within a second size distribution range, from a first quantity of sinterable powder particles contained within a container and having sizes falling within a first size distribution range, and where the sizes of the powder particles in the second size distribution range are all larger than the sizes of the particles in the first size distribution range, the system comprising:

an electronic controller;

a memory in communication with the electronic controller for storing a plurality of different temperature/time heating profiles for use with different types of powder particles, the plurality of different temperature/time heating profiles using a starting dimension of the powder particles;

a temperature sensor placed within the first quantity of sinterable powder particles, the electronic controller further being in communication with the temperature sensor for receiving temperature signals from the temperature sensor for use in implementing a selected one of the plurality of different the temperature/time heating profiles;

a furnace operating as a heating component for receiving the container and heating the sinterable powder particles, the furnace being responsive to the selected one of the plurality of different temperature/time heating profiles, the selected one of the different temperature/time heating profiles being implemented and controlled by the electronic controller to produce in the heating component a predetermined temperature ramp-up heating time period, followed by a predetermined temperature hold time period, followed by a predetermined cooling time period, and configured to heat the first quantity of sinterable powder particles using the predetermined temperature/time heating profile, to cause partial sintering of ones of the powder particles within the first quantity of sinterable powder particles to create a new plurality of powder particles which have an increased dimension; and a movement component in communication with the electronic controller, and at least partially controlled by the electronic controller, to at least one of separate the new powder particles from remaining ones of the powder particles of the first quantity of sinterable powder particles, or to further process the new plurality of powder particles, such that the new plurality of powder particles represents the second quantity of sinterable powder particles.

2. The system of claim 1, wherein the memory further includes at least one data file including at least one of:

characteristics of the powder particles of the first quantity of powder particles;

a desired size distribution range for at least one specific type of powder particles;

sintering temperatures and duration needed for sintering different types of powder particles; or atmospheric conditions, including at least one of gas or vacuum, during sintering.

3. The system of claim 1, wherein the movement component to at least one of separate or further process the first quantity of sinterable powder particles to provide the new plurality of powder particles comprises a sieve to separate out, through vibration or movement thereof, the new plurality of powder particles from remaining ones of the first quantity of sinterable powder particles.

4. The system of claim 1, wherein the movement component to at least one of separate or further process the new plurality of powder particles comprises a mill which carries out a milling operation to process the new plurality of powder particles to form modified powder particles which all have the second size distribution.

5. The system of claim 4, wherein the milling operation breaks down the modified powder particles to reduce dimensions of the modified powder particles to produce the second quantity of powder particles which have the second size distribution.

6. The system of claim 1, wherein the temperature of the heating component is monitored and adjusted by the electronic controller while the partial sintering of the first quantity of powder particles is occurring.

7. The system of claim 3, wherein the electronic controller is configured to assist in controlling the sieve.

8. A system for creating a second quantity of sinterable powder particles which have sizes falling within a second size distribution range, from a first quantity of sinterable powder particles having sizes falling within a first size distribution range, and contained within a container, and where the sizes of the second quantity of sinterable powder particles in the second size distribution range are all larger than the sizes of the first quantity of powder particles in the first size distribution range, the system comprising:

an electronic controller;

a memory in communication with the electronic controller for storing, the memory being configured to store a plurality of different ones of temperature/time heating profiles for different types of powder particles, the plurality of different temperature/time heating profiles further using a starting dimension of the first quantity of sinterable powder particles, and the memory further including a data file for containing a desired size distribution range for at least one specific type of powder particles;

a temperature sensor placed in the first quantity of sinterable powder particles, the electronic controller further being in communication with the temperature sensor for receiving temperature signals from the temperature sensor for use in implementing a selected one of the temperature/time heating profiles;

a furnace operating as a heating component, for receiving the container and heating the first quantity of sinterable powder particles, the furnace being responsive to the electronic controller and configured to apply a predetermined, temperature/time heating profile including a predetermined temperature ramp-up time period, a predetermined temperature hold time period, and a predetermined cool down period to the first quantity of sinterable powder particles to controllably heat the first quantity of sinterable powder particles using the temperature/time heating profile, to cause partial sintering of ones of powder particles within the first quantity of sinterable powder particles to create a new plurality of powder particles which have an increased dimension;

a sieve in communication with the electronic controller and controlled by the electronic controller, the sieve controlled to separate the new plurality of powder particles from remaining ones of the powder particles of the first quantity of sinterable powder particles, such that the new plurality of powder particles represents the second quantity of sinterable powder particles.

9. The system of claim 8, wherein the memory is further configured to store at least one data file relating to at least one of a material type or a powder size.

10. A system for creating a second quantity of sinterable powder particles which have sizes falling within a second size distribution range, from a first quantity of sinterable powder particles contained within a container and having sizes falling within a first size distribution range, and where the sizes of the powder particles in the second size distribution range are all larger than the sizes of particles in the first quantity of sinterable powder particles falling within the first size distribution range, the system comprising:

an electronic controller;

a memory in communication with the electronic controller for storing a plurality of different temperature/time heating profiles, wherein the memory is configured to store a plurality of different ones of the temperature/time profiles for different types of powder particles;

the memory further storing information on each of:

different types of powder;

different powder sizes; and an average starting particle dimension of the first quantity of sinterable powder particles;

a temperature sensor placed within the first quantity of sinterable powder particles the electronic controller further being in communication with the temperature sensor for receiving temperature signals from the temperature sensor for use in implementing a selected one of different temperature/time heating profiles;

a furnace operating as a heating component responsive to the electronic controller, for heating the first quantity of sinterable powder particles, the furnace configured to apply the selected one of the different, temperature/time heating profile, dependent on an average particle dimension of powder particles of the first quantity of sinterable powder particles, and including a predetermined temperature ramp-up time period, a predetermined temperature hold time period, and a predetermined cool down period, to the first quantity of sinterable powder particles to controllably heat the first quantity of sinterable powder particles using the temperature/time heating profile, to cause partial sintering of ones of the powder particles within the first quantity of sinterable powder particles to create a new plurality of powder particles which each have an increased dimension larger than the second size distribution range;

a sieve at least partially controlled by the electronic controller, and further configured to separate the new plurality of powder particles from remaining ones of the powder particles; and a mill controlled to further process the new plurality of powder particles to break down the new plurality of powder particles such that each one of the new of plurality of powder particles is reduced in dimensions to fall within the second distribution range.

11. The system of claim 10, wherein the electronic controller generates control signals for applying the selected one of the, temperature/time heating profiles to the heating component.

* * * * *